(12) United States Patent
Giroud et al.

(10) Patent No.: US 10,091,024 B2
(45) Date of Patent: Oct. 2, 2018

(54) RADIOCOMMUNICATION INFRASTRUCTURE FOR A RAILWAY SIGNALLING SYSTEM OF THE CBTC TYPE

(71) Applicant: ALSTOM TRANSPORT TECHNOLOGIES, Saint-Ouen (FR)

(72) Inventors: Anne-Cecile Giroud, Villeurbanne (FR); Henri Madranges, Lyons (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 28 days.

(21) Appl. No.: 15/508,628

(22) PCT Filed: Sep. 1, 2015

(86) PCT No.: PCT/EP2015/069957
§ 371 (c)(1),
(2) Date: Mar. 3, 2017

(87) PCT Pub. No.: WO2016/034587
PCT Pub. Date: Mar. 10, 2016

(65) Prior Publication Data
US 2017/0279636 A1    Sep. 28, 2017

(30) Foreign Application Priority Data

Sep. 4, 2014  (FR) ..................................... 14 58281

(51) Int. Cl.
*H04L 12/437*      (2006.01)
*B61L 27/00*       (2006.01)
(Continued)

(52) U.S. Cl.
CPC ........ *H04L 12/437* (2013.01); *B61L 27/0005* (2013.01); *B61L 27/0038* (2013.01);
(Continued)

(58) Field of Classification Search
CPC ....... H04L 12/437; H04L 45/22; H04L 45/48; H04L 45/502; H04L 45/50;
(Continued)

(56) References Cited

U.S. PATENT DOCUMENTS 5,420,883 A  *  5/1995  Swensen ................. B61L 3/125
                                                   342/450
2005/0226158 A1* 10/2005 Takahashi ............. H04L 67/125
                                                   370/236
(Continued)

FOREIGN PATENT DOCUMENTS

CN        101009679 A      8/2007
CN        101222327 A      7/2008
(Continued)

OTHER PUBLICATIONS

Kraft, H., "Network Architectures in the Context of SwISS of NeuPro," Signal + DRAHT, vol. 105, No. 12, Dec. 2013, pp. 11-13 with English Translation.
(Continued)

*Primary Examiner* — Warner Wong
(74) *Attorney, Agent, or Firm* — Young & Thompson

(57) ABSTRACT

This infrastructure includes a network MPLS; first and second groups of access points associated with each section of the track; first and second modems, on the train, communicating with access points of the first and second groups. The network includes pairs of local switches, each associated with a section of the track and including first and second local switches for communication with, respectively, the first and second groups of access points of the associated section, and first and second central switches, the switches being in series with one another and implementing a service for defining paths between each central switch and each local switch so the path between the first central switch and the first local switch of a pair and the path between the second (Continued)

Figure 1:
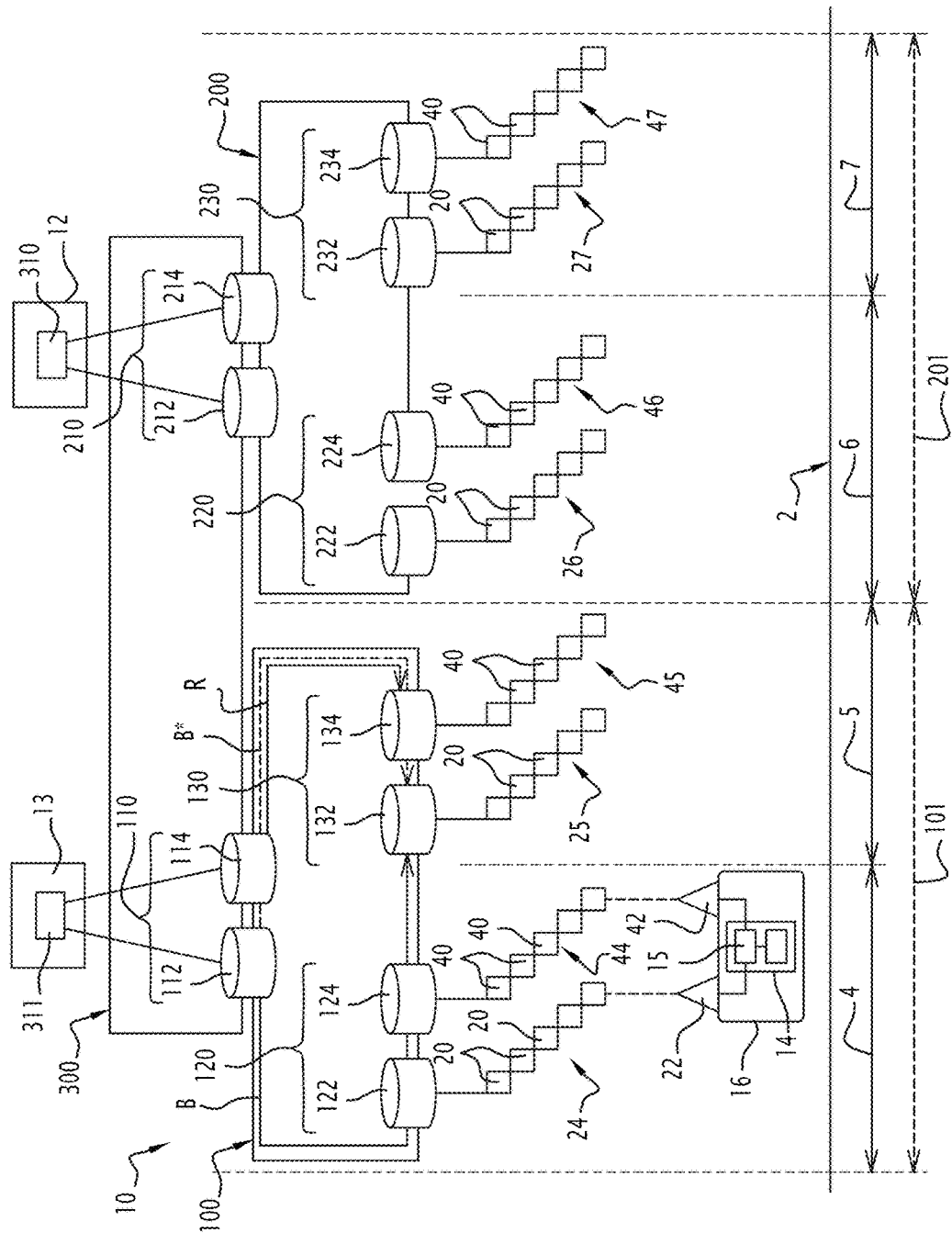

central switch and the second local switch of this pair correspond to separate portions of the ring formed by the network.

10 Claims, 2 Drawing Sheets

(51) Int. Cl.
| | |
|---|---|
| *B61L 27/04* | (2006.01) |
| *H04L 12/707* | (2013.01) |
| *H04L 12/24* | (2006.01) |
| *H04W 40/34* | (2009.01) |
| *H04L 12/723* | (2013.01) |
| *H04L 29/08* | (2006.01) |

(52) U.S. Cl.
CPC .......... *B61L 27/04* (2013.01); *H04L 41/0668* (2013.01); *H04L 41/0672* (2013.01); *H04L 41/0816* (2013.01); *H04L 45/22* (2013.01); *H04L 45/502* (2013.01); *H04W 40/34* (2013.01); *B61L 2027/005* (2013.01); *B61L 2205/00* (2013.01); *H04L 67/125* (2013.01)

(58) Field of Classification Search
CPC ............. H04L 41/0816; H04L 41/0672; H04L 41/0668; H04L 41/06; H04L 41/0654; H04L 47/285; H04L 47/76; H04L 47/762; H04L 47/765; H04L 47/767; H04L 49/557; H04L 67/125; B61L 27/0005; B61L 27/0038; B61L 2205/008611; H04W 4/50; H04W 28/0226
See application file for complete search history.

(56) References Cited

U.S. PATENT DOCUMENTS

| | | | | |
|---|---|---|---|---|
| 2005/0272431 A1* | 12/2005 | Katori | ............... | H04W 36/0005 |
| | | | | 455/446 |
| 2007/0082672 A1* | 4/2007 | Fujioka | .................... | H04B 7/26 |
| | | | | 455/436 |
| 2009/0184211 A1* | 7/2009 | Groves, Jr. | ......... | B61L 27/0038 |
| | | | | 246/3 |
| 2011/0230197 A1* | 9/2011 | Wu | ....................... | H04W 72/04 |
| | | | | 455/450 |
| 2011/0267969 A1* | 11/2011 | Ceccherini | ........ | H04W 36/0083 |
| | | | | 370/252 |
| 2012/0147864 A1* | 6/2012 | Guo | ........................ | B66B 13/22 |
| | | | | 370/338 |
| 2012/0163317 A1* | 6/2012 | Yu | .......................... | H04B 7/024 |
| | | | | 370/329 |
| 2012/0320875 A1* | 12/2012 | Ishihara | ................... | B60L 15/40 |
| | | | | 370/331 |
| 2013/0215747 A1* | 8/2013 | Jia | ........................... | H04L 45/22 |
| | | | | 370/235 |
| 2013/0336275 A1* | 12/2013 | Carroll | ..................... | H04L 45/54 |
| | | | | 370/329 |
| 2014/0146749 A1* | 5/2014 | Barker | ................ | H04W 40/026 |
| | | | | 370/328 |
| 2014/0149547 A1* | 5/2014 | Barker | .................. | H04W 48/20 |
| | | | | 709/217 |
| 2014/0191089 A1* | 7/2014 | Reichlin | ................. | B61L 19/06 |
| | | | | 246/3 |
| 2014/0204769 A1* | 7/2014 | Hirano | .................. | H04W 24/04 |
| | | | | 370/245 |
| 2014/0204906 A1* | 7/2014 | Sergeev | ................ | H04W 36/18 |
| | | | | 370/331 |
| 2014/0226559 A1* | 8/2014 | Jactat | ................ | H04W 36/0055 |
| | | | | 370/315 |
| 2015/0132010 A1* | 5/2015 | Brownjohn | ............ | H04B 10/27 |
| | | | | 398/140 |
| 2016/0241367 A1* | 8/2016 | Irmer | ..................... | H04W 4/046 |
| 2016/0269964 A1* | 9/2016 | Murray | ................. | H04W 36/08 |
| 2017/0149603 A1* | 5/2017 | Kojima | ............... | H04L 41/0677 |

FOREIGN PATENT DOCUMENTS

| | | |
|---|---|---|
| CN | 101568019 A | 10/2009 |
| DE | 102010027131 A1 | 1/2012 |
| EP | 1995916 A1 | 11/2008 |
| WO | 00/52851 A1 | 9/2000 |

OTHER PUBLICATIONS

Hoebeke, R., et al., "Migrating Metro Ethernet to MPLS: Next Step for Profitable Metro Ethernet Services," Alcatel Telecommunications Review, Oct. 2004, 12 pages.

Van De Voorde, I., et al., "Carrier-Grade Ethernet: Extending Ethernet into Next Generation Metro Networks," Alcatel Telecommunications Review, Jul. 2002, 10 pages.

Witters, J., et al., "VPLS Technical Tutorial," Alcatel Telecommunications Review, Oct. 2004, 9 pages.

"IP Backbones Support Efficient Operation," Signal + Draht, vol. 102, No. 9, Sep. 2010, pp. 52-53 with English Translation.

Hoebeke, R., et al., "MPLS: Adding Value to Networking," Alcatel Telecommunications Review, Jul. 2002, 9 pages.

Bonn, H., et al., "Railway Communication—Requirements for a Future-Proof IP Infrastructure," Signal + Draht, Mar. 2013, pp. 6-10 with English Translation.

Liem, M., et al., "Mission Critical Communication Networks for Railways," Bell Labs Technical Journal, vol. 16, No. 3, Dec. 2011, pp. 29-46.

International Search Report issued in Application No. PCT/EP2015/069957, dated Nov. 30, 2015.

* cited by examiner

RADIOCOMMUNICATION INFRASTRUCTURE FOR A RAILWAY SIGNALLING SYSTEM OF THE CBTC TYPE

The present invention relates to a radiocommunication infrastructure for a railway signaling system of the CBTC type, allowing communication between a computer on the ground and a onboard computer on-board a train circulating on a track, the radiocommunication infrastructure achieving redundancy of the communication between the computer on the ground and the on-board computer, by establishing a first communication along a first path and a second communication along a second path, the infrastructure including: a communication network; a first plurality of access points and a second plurality of access points, positioned along the track and connected to the communication network; a first modem, dedicated to the establishment of a first wireless connection with the first access points, and a second modem, dedicated to the establishment of a second wireless connection with the second access points, the first and second modems being on-board the train.

A railway signaling system of the CBTC type ("Communication Based Train Control") is based on the continuous communication between onboard computers on-board trains circulating on the railway network and computers on the ground responsible for controlling the traffic.

The signaling system for example includes on the ground, an ATS ("Automatic Train Supervision") system for localizing and supervising trains on the network, an ATC ("Automatic Train Control") system for managing trains and generating movement authorizations, a movement authorization being transmitted to a train in order to authorize it to advance on a following section of the network.

The computers on-board trains communicate with computers on the ground, via a radiocommunication infrastructure, preferably of the Wi-Fi type. The latter includes a plurality of access points, distributed along the tracks of the railway network, in order to ensure continuous coverage along the tracks. The infrastructure includes a plurality of local networks unifying a group of access points located in proximity to each other, and a communication network ("backbone") to which is connected each local network of the plurality of local networks.

Physically, such a communication network is deployed along the track.

The communication network should meet strong functional constraints. It should notably be reliable and robust with regard to failures, regardless of the failure and the location of occurrence of this failure along the track, so as to ensure continuous communication between the ground and on-board. By "continuous", is meant that every interruption of the on-board/ground communication should last less than 200 ms.

In order to meet this type of functional constraints, physical redundancy is conventionally applied. It is thus known how to apply two radiocommunication infrastructures in parallel with each other, and to equip each train so that it includes a first transmission/reception means (first modem), generally placed at the head of the train, able to establish a temporary connection with the access points of the first infrastructure, and a second transmission reception means (second modem), generally placed at the end of the train able to establish a temporary connection with the access points of the second infrastructure.

Frame duplicators, on-board the trains, between the first and second modems and the on-board computer and, on the ground, between the first and second infrastructures and the computers on the ground, giving the possibility of transmitting a data frame from the ground to on-board or from on-board to the ground, via the first infrastructure and via the second infrastructure, simultaneously.

The first and second communication paths followed by a data frame are generally designated as "red" and "blue" by one skilled in the art.

With such an architecture, the on-board/ground communication is guaranteed in the case of failure of the communication network of an infrastructure, it may further be ensured via the communication network of the other infrastructure. More generally, even if a communication path degrades the transmission of a data frame, the other path will allow the on-board/ground communication to occur in a rated way. The probability that a failure affects both communication paths at the same instant is low.

This structure of the physical layer gives the possibility of guaranteeing the continuity of the communication.

Presently, the deployed communication networks are of the SDH ("Synchronous Digital Hierarchy") type according to the standardization in effect in Europe, which is equivalent to the SONET ("Synchronous Optical NETwork") standardization in effect in the United States.

The communication networks of the SDH type provide different services.

An SDH network is deterministic, giving the possibility of specifically defining resilience and latency times, as well as a band pass.

An SDH network notably applies a protocol MS-SP providing a failure detection service automatically putting back into service allowing the guarantee of a short resilience time between the detection of a failure and the return to the normal condition of the network. This protocol is based on the supervision of data introduced into the header portion of the SDH frames. In the case of a failure, the resilience time is short, which makes these communication networks particularly well adapted to the applications of railway signaling.

Further, the band pass and the latency time of these networks are also guaranteed by the application of a time-division multiplexing mechanism.

They also provide a service giving the possibility of configuring virtual channels and of dedicating each channel to a particular application, so as to guarantee allocation of a fixed band pass for each application, in particular to the signaling application.

However, the procedures for extending a network of the SDH type are wieldy. For example it is necessary, in the case of an extension of the communication network, to reconfigure the totality of the network. This then requires testing again and entirely the network once it is extended.

Further it is not possible to prepare the configuration offline, without having the totality of the extended network. The starting up of the extended network therefore takes significant time, during which the railway network cannot be utilized.

It is also necessary to deploy an architecture, the complexity of which increases with the size of the network.

Therefore there is a need for upgrading the existing networks while retaining the physical architecture with two redundant communication paths.

The object of the invention is therefore an infrastructure, characterized in that the communication network is of the MPLS type, preferably of the IP-MPLS type, and has a ring topology, the communication network including a plurality of pairs of local switches, each pair of switches being associated with a section of the track and including a first local switch dedicated to communication with the first group of access points associated with said section and a second local switch dedicated to the communication with the second group of access points associated with said section; and first and second central switches, the switches being connected in series with each other, the computer on the ground being connected to the central switch, and each switch applies a service for defining path, a failure detection service, and a reconfiguration service, the path definition service giving the possibility of predefining communication paths between two switches of each doublet of switches consisting of a central switch and of a local switch, so that the path between the first central switch and the first local switch of a pair of switches and the path between the second central switch and the second local switch of said pair of switches are carried out along separate portions of the ring formed by the network.

According to particular embodiments, the infrastructure includes one or several of the following features, taken individually or according to all the technically possible combinations:
- said infrastructure includes a plurality of sectors, each sector including a communication network aggregating the local networks of a plurality of sections;
- said or each central switch of each communication network is a node of a capped communication network of the MPLS type, also having a ring topology;
- the first and second central switches of a communication network are integrated into an integrated electric switch;
- the first local switches and the second local switches of a communication network are placed in alternation within said network;
- said infrastructure includes an administration interface;
- said infrastructure applies a priority/segregation service allowing communication, over said or each communication network, of data for applying signaling and of data of other types of applications;
- each switch applies a service for configuring SDP paths giving the possibility of configuring tunnel connections between two switches of a same network of the infrastructure;
- the value "Spoke SDP" is assigned to each connection between a local switch and a central switch of an aggregation network and the value "Mesh SDP" is assigned to each tunnel connection on the capped network between a central switch of a sector and a central switch of another sector.

Figure 2:
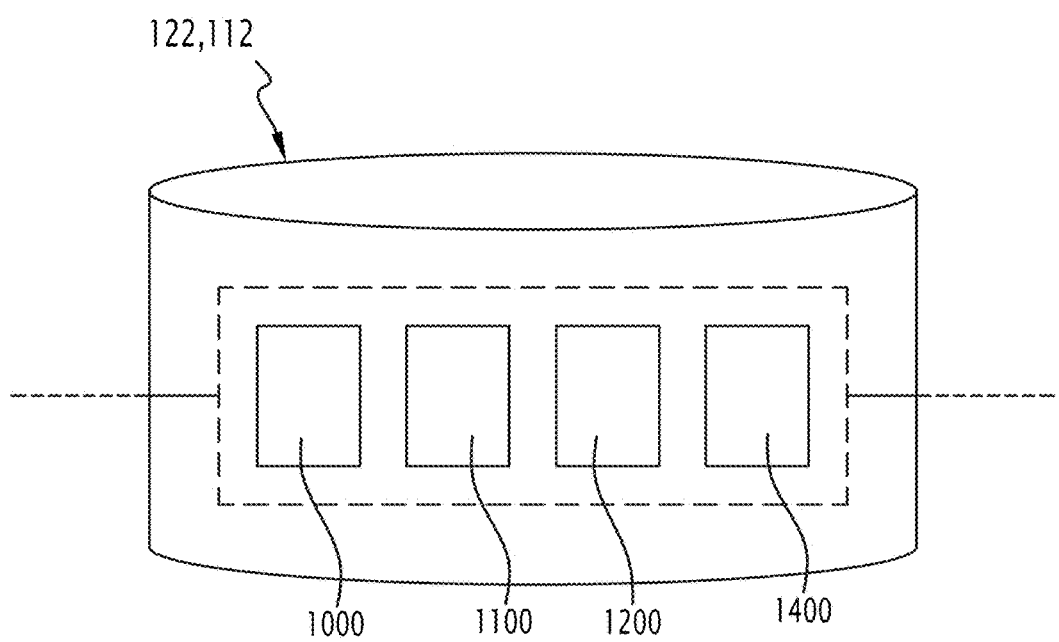

The invention and advantages thereof will be better understood upon reading the detailed description which follows of a particular embodiment, only given as a non-limiting example, the description being made with reference to the appended drawings wherein:

FIG. 1 is a schematic illustration of an infrastructure according to the invention; and, FIG. 2 is a schematic illustration of a switch of the infrastructure of FIG. 1, applying a plurality of services.

The infrastructure according to the invention applies a communication network of the MPLS type, in particular of the IP-MPLS type. IP-MPLS networks are known. However, an IP-MPLS network is not deterministic unlike an SDH network.

With an IP-MPLS network, a priori it is not possible to guarantee a resilience time after the occurrence of a failure.

Therefore it is not obvious to apply an IP-MPLS network for a railway signaling application, which requires the guarantee of the pass band, the latency time and the resilience time for observing the constraint of continuity of the on-board/ground communication.

The use of an IP-MPLS network is only possible in a signaling application provided that the physical and logic layers of the IP-MPLS network applied are configured very specifically.

In a schematic way in FIG. 1, a radiocommunication infrastructure 10 is illustrated for a railway signaling system of the CBTC type.

In FIG. 1, a railway network is schematically illustrated by one track, generally reference with the number 2.

The track 2 is subdivided into a plurality of successive sections 4, 5, 6 and 7.

The infrastructure 10 allows communication between computers on the ground 12 and 13, and an on-board computer, such as the onboard computer 14 on-board the train 16 circulating on the track 2.

The ground computers 12 and 13 for example execute a ATC ("Automatic Train Control") signaling application.

The infrastructure 10 achieves a redundancy of the communication between the ground computers 12 and 13 and the on-board computer 14, by establishing a first communication along a first path and, in parallel, a second communication along a second path.

The adjective « blue » will subsequently be used for describing the components of the infrastructure 10 forming the first communication path, and the adjective « red », for describing the components of the infrastructure 10 forming the second communication path, according to custom use in this technical field.

The infrastructure 10 includes a plurality of blue access points 20 and a plurality of red access points 40.

An access point gives the possibility of establishing a wireless link with a suitable transmission/reception module, or modem. Preferably, this wireless link observes the Wi-Fi protocol. As the range of an access point Wi-Fi is short, the access points are placed in close proximity to the track 2.

The plurality of blue access points 20 is subdivided into groups of blue access points 24, 25, 26 and 27, each group being associated with a sector of the track 2.

The blue access points of a same group give the possibility of defining a continuous radioelectric coverage along the corresponding sector. The coverages of two groups of blue access points, associated with neighboring sectors, partly overlap in order to guarantee the continuity of the communication along the blue path, when the train 16 crosses the boundary between two sectors.

The blue access points 20 of a same group are connected to a blue local communication network, of the LAN ("Local Area Network") type.

A similar description may be made for the plurality of red access points 30, which is subdivided into groups of red access points 44, 45, 46 and 47, each group being associated with a sector of the track 2. The red access points 40 of a same group are connected to a red local communication network of the LAN type.

The infrastructure 10 includes, on-board each train 16, circulating on the track 2, a blue modem 22 or a red modem 42.

The blue modem 22 is dedicated to the establishment of a first wireless Wi-Fi link with the blue access points 20, while the red modem 42 is dedicated to establishing a second wireless Wi-Fi link with the red access points 40.

The on-board computer 14 includes a frame duplicator 15 which has the function of duplicating the frames transmitted by the on-board computer 14 to a ground computer 12 or 13, so as to transmit over the infrastructure 10 a blue frame on a blue path and a red frame on a red path.

On the ground, the infrastructure 10 includes a lower hierarchical level including first and second communication networks 100 and 200, and an upper hierarchical level including a third communication network 300 or a capped network.

The first and second communication networks 100 and 200 are identical with each other.

The first network 100 allows aggregation of the blue and red local networks of sections 4 and 5, so as to define a first sector 101 in the infrastructure 10, while the second network 200 allows aggregation of the blue and red local networks of sections 6 and 7, so as to define a second sector 201 in the infrastructure 10.

The first network 100 is of the IP-MPLS type.

The first network 100 consists of nodes and links between nodes. The first network 10 has a specific topology forming a single ring closed on itself. Thus, each node of the network is connected in series to two neighboring nodes.

A node of the network 100 consists of an MPLS switch.

A switch is a network piece of equipment operating on the second connection layer of the OSI model ("Open Systems Interconnection") as opposed to a rooter which is a piece of equipment operating on the third network layer of this model.

A switch is connected to a neighboring switch through two unidirectional optical links. For the communication between a switch and a neighboring switch, one of the optical links operates in transmission for the relevant switch and the other one, in reception for the relevant switch.

The first network 100 includes a pair of central switches 110 and two pairs of local switches, 120 and 130. A network includes as many pairs of local switches which it aggregates in sections of the track 2.

The pair of central switches 110 includes a blue central switch 112 and a red central switch 114.

A pair of local switches 120, 130 respectively, includes a blue local switch 122, 132 respectively, and a red local switch, 124, 134 respectively.

The pairs of switches are connected to each other following the others so that the blue switches and the red switches are placed in alternation one behind the other within the first network 100.

The blue local switch 122 of the first pair 120 is connected to the blue local network of the section 4. The red local switch 124 of the first pair 120 is connected to the red local network of the section 4.

It should be noted that each local switch includes a pair of ports allowing it to be connected to the communication network of the lower hierarchy and a local port allowing it to be connected to the local network.

The blue local switch 132 of the second pair 130 is connected to the blue local network of section 5. The red local switch 134 of the second pair 130 is connected to the red local network of the section 5.

A similar description may be made of the second network 200 which successively includes a blue central switch 212, a red central switch 214, a blue local switch 222, connected to the blue local network of the section 6, a red local switch 224, connected to the red local network of the section 6, a blue local switch 232, connected to the blue local network of the section 7, and a red local switch 234, connected to the blue local network of the section 7.

The capped network 300 is of the IP-MPLS type. It also has a topology forming a ring, the switches being placed in series and connected together so as to form a closed loop.

The capped network 300 includes as many pairs of central switches as it aggregates communication network of the lower hierarchical level.

The capped network 300 gives the possibility of connecting between them the communication networks of each sector of the infrastructure 10.

It should be noted that each central switch includes a pair of lower communication ports allowing it to be connected to the communication network of the lower hierarchy and a pair of upper communication ports allowing it to be connected to the capped network of the upper hierarchy.

In the embodiment described here, each computer on the ground is connected directly to a single pair of central switches. Thus, the computer 12 is connected to the pair of central switches 112 and 114, while the computer 13 is connected to the pair of central switches 212 and 214. In this architecture, a ground computer is therefore dedicated to the management of a particular sector.

A frame duplicator is integrated to each ground computer. The duplicator 310 of the computer 12 allows duplication of the frames transmitted by the ground computer 12 to the on-board computer 14, so that, on the infrastructure 10, a blue frame is transmitted on the blue path and a red frame on the red path. The duplicator 311 of the computer 13 allows duplication of the frames transmitted by the ground computer 13 to the on-board computer 14, so that on the infrastructure 10 a blue frame is transmitted on the blue path and a red frame is transmitted on the red path.

Advantageously, each communication network, 100, 200, 300, includes an administration interface, not shown in FIG. 1, allowing an operator to configure the logic layer of each network by parameterizing the services applied by the switches of this network.

It should be noted that the ring formed by each communication network is common to the blue path and to the red path.

In one alternative, the pair of central switches of a communication network are integrated into a same piece of network equipment of the MPLS electrical switch type, which is a piece of equipment which is intrinsically redundant.

In further another alternative, independent from the preceding one, a modem, for example the blue modem of a train, is able to use the red path for communicating blue frames, for example in the case of failure of the blue access point. The red switch of the pair of central switches of a communication network of the lower hierarchical level is then able to detect the blue frames circulating on a red path and of re-transmitting the detected blue frames on the blue path of the communication network of the upper hierarchical level.

As the physical layer has been detected, the logic layer will now be presented in detail. In FIG. 2, a generic switch (either local or central) of an MPLS network of the infrastructure 10 and the different services which it executes is schematically illustrated.

The MPLS protocol includes, as a basis, a plurality of services, able to be executed by each switch MPLS.

According to the MPLS protocol, each switch notably applies a service 1,000 for defining paths through the MPLS network, so called LSP ("Label Switched Path") path.

This service gives the possibility of defining the path which a frame has to follow so as to be transferred, through the communication network MPLS, between a source switch and a destination switch.

According to the MPLS protocol, each switch also applies a service 1,100 for detecting a failure.

According to the MPLS protocol, each switch applies a service 1,200 for automatic reconfiguration giving the possibility of solving simple failures.

However, in practice, both of these last protocol services require about 300 ms for detecting a failure and carrying out the required reconfiguration (even if the strictly speaking reconfiguration is specified as only taking 50 ms). Such a resilience time is not compatible with a signaling application, which requires that an interruption does not last for more than 200 ms.

In order to meet this constraint, during a phase for configuring the infrastructure 10, a single LSP path is defined for each possible pair of switches within a same network, and this for each network 100, 200, 300 constitutive of the infrastructure.

Further, the blue LSP path defined between a first blue switch and a second blue switch is complementary to the red LSP path defined between the first red switch associated with the first blue switch and the second red switch associated with the second blue switch. In this way, the blue and red frames of a same communication do not pass in transit through any link, or any common switch.

For example, for a communication between the computer on the ground and an on-board computer located on the section 5, a blue path B is defined statically between the blue central MPLS node 112 and the blue local MPLS node 132, as well as a red path R between the red central MPLS node 114 and the red local MPLS node 134. The blue path B will be ensured in an anti-clockwise direction and the red path will be ensured in a clockwise direction R, so that the blue and red frames of a same communication do not pass in transit through any link, or any common switch.

When a failure is detected on the link between the switches 122 and 124 (schematized by a cross on the corresponding segment of FIG. 1), preventing the communication of blue frames along the blue LSP path B, the services 1,100 and 1,200 for detecting a failure and for automatic reconfiguration of the switches forces the conveyance of the blue frame between the blue central switch 112 and the blue local switch 132 along the blue path B*, which passes through the intermediate switch 134, the circulation of the frame along the blue path B* being performed in the clockwise direction in the ring formed by the network 100. This introduces an interruption on the blue communication of a maximum of 300 ms. However, in parallel, the red LSP path R is not degraded by the failure, no communication interruption will be observed on this red path, so that there will be continuity of the communication between the on-board computer and the ground computer.

According to the MPLS protocol, each switch also applies a service 1,400 for defining SDP paths ("Service Distribution Point").

Generally, a datum to be conveyed in an MPLS network, between a source node and a destination node, is encapsulated in a specific datagram, the frame of which is able to be rooted through the MPLS network between the source node and the destination node. Such a transmission by specific encapsulation between a node source and a destination node is also designated as a tunnel link between the source node and the destination node.

In the infrastructure 10, the service 1,400 for defining the SDP path gives the possibility of defining the tunnel link between a source switch and a destination switch, and this for each possible pair of switches within a same network of the infrastructure.

Advantageously, the SDP paths of a network, 100, 200 or 300, form a sub-set of the LSP paths defined on this network.

SDP paths are thus configured so as to limit the use of the resources on an MPLS node. For example, for a network, a tunnel link is provided between the central switch and each local switch of a given color, but no tunnel link is directly generated between two local switches of a given color.

Generally, an SDP path has an attribute which may assume either the value "Spoke SDP" or the value "Mesh SDP". A frame circulating on an SDP path "Spoke SDP" may pass in transit towards another SDP path, regardless of the value of its attribute. On the other hand, a frame circulating on an SDP path "Mesh SDP" can only transit towards an SDP path "Spoke SDP".

In the infrastructure 10, an SDP path between a local switch and a central switch is configured for assuming the value "Spoke SDP" so as to authorize a point-to-point communications between two sections of a same sector, for example 4 and 5 through the network 100.

An SDP path between two central switches of different sectors is configured for assuming the value "Mesh SDP", so as to authorize a multipoint communication between two sections of different sectors, for example 5 and 6 through the networks 100, 300 and then 200.

In this way, when the train 16 physically crosses the boundary between two neighboring sections, regardless of whether both neighboring sections belong to a same sector or to two different sectors, a communication between these neighboring sections may be established, allowing a continuity of the communication on-board—ground during the crossing of the boundary.

It should be noted that if all the SDP paths were configured with an attribute having a value "Spoke SDP", there would be a risk of generating loops on the infrastructure 10. Now a loop on an Ethernet network means amplification of the diffusion traffic and the saturation of the network ("broadcast storm"). Moreover, if all the SDP paths were configured with an attribute having a value "Mesh SDP", the possibility of communicating between two stations of different sectors would be forbidden.

Moreover, the band pass and the latency of the infrastructure 10 are guaranteed by the quality characteristics of the MPLS service (QoS).

The subdivision into sectors of the physical layer of the infrastructure 10 gives the possibility, when a network associated with a sector is faulty (serious failure), of not affecting the proper operation of the other sectors of the infrastructure. Equivalently, the increase of the infrastructure during an extension of the path and the addition of new sectors is carried out easily.

A MPLS network has very many advantages.

The application of an MPLS network gives the possibility of obtaining larger data transfer rates (up to a band width of 10 Gbps) than that of a SDH network, with the same service quality.

The application of an MPLS network gives the possibility of achieving more flexible topologies, notably allowing extensions of the infrastructure without having to reconfigure the whole of the network, but only the new networks associated with new track sections during an extension of the railway network, or the sole blue and red local connectors for aggregating a new local network with an existing network. It is notably possible to prepare a configuration of line and to configure or modify the configuration of an existing network rapidly, thus minimizing the interruption time of the utilization of the railway network.

The application of an MPLS network in a ring aggregating local networks per track sector gives the possibility of reducing the length of the cables (in this case optical fibers)

used for connecting the pieces of network equipment with each other, with on top of this, a reduction in the cost for deployment of the infrastructure.

Advantageously, an IP-MPLS network gives the possibility of applying a priority/data segregation service, authorizing the use of the network for communicating data other than signaling data.

These are for example data of multimedia applications allowing the display of pieces of information in a station or the broadcasting of suitable sound messages by a computer connected to the local network associated to a section of the track.

The application of the segregation service gives the possibility of ensuring that the communication of the signaling application data, having a high priority attribute, is not affected by the communication of data of other applications, having a low priority attribute, in particular during an overflow of non-priority data.

The application of an MPLS network allows some flexibility in the allocation of the band pass among different applications. This gives the possibility of guaranteeing a band pass for each application and in the case of availability of a band pass, of dynamically allocating an increase in the band pass to an application up to a maximum predefined for this application.

This possibility of circulating heterogeneous frames on the same network allows an operator of the railway network to avoid having to deploy an independent communication network dedicated to these additional applications.

One skilled in the art will understand that for, reasons of clarity, the embodiment illustrated in FIG. 1 is particularly simple. Many alternatives are possible in terms of the number of sections, the number of sectors, how to aggregate the sections within sectors, of the number of ground computers managing one or several sectors, etc.

The invention claimed is:

1. A radiocommunication infrastructure for a railway signaling system of a communication-based train control type, allowing a communication between a ground computer and an onboard computer located on-board a train circulating on a track, the track being subdivided into sections, the radiocommunication infrastructure achieving redundancy of the communication between the ground computer and the onboard computer, by establishing a first communication along a first path and a second communication along a second path, the radiocommunication infrastructure including:
    a communication network;
    a first plurality of access points and a second plurality of access points, the access points being positioned along the track, the first and the second pluralities of access points being respectively subdivided into first and second groups of access points, each group of access points forming a local communication network, a first group of access points and a second group of access points being associated with each section of the track and being connected to the communication network;
    a first modem dedicated to establishing a first wireless link with access points of the first plurality of access points, and a second modem dedicated to establishing a second wireless link with access points of the second plurality of access points, the first and second modems being located onboard the train; wherein the communication network is of a MPLS type and has a topology forming a ring, the communication network including a plurality of pairs of local switches, each pair of local switches being associated with a section of the track and including a first local switch dedicated to the communication with the first group of access points associated with said section and a second local switch dedicated to the communication with the second groups of access points associated with said section; and first and second central switches, the local and central switches being connected in series with each other, the ground computer being connected to the first and second central switches,
    and wherein each switch realizes a service for defining paths, a service for detecting a failure, and a service for reconfiguration, the service for defining paths being used to define predefining communication paths between two switches of each doublet of switches consisting of a central switch and a local switch, so that a predefining communication path between the first central switch and the first local switch of a pair of local switches and a predefining communication path between the second central switch and the second local switch of said pair of local switches are carried out along separate portions of the ring formed by the communication network.

2. The infrastructure according to claim 1, including a plurality of sectors, each sector including a communication network aggregating the local networks of a plurality of sections.

3. The communication infrastructure according to claim 2, wherein said or each central switch of each communication network forms a node of a capped communication network of a MPLS type, having a ring topology.

4. The communication infrastructure according to claim 2, wherein each switch applies a service for configuring SDP paths for configuring tunnel links between two switches of the same network of the communication infrastructure.

5. The communication infrastructure according to claim 4, wherein a value "Spoke SDP" is assigned to each link between a local switch and a central switch of a communication network and a value "Mesh SDP" is assigned to each tunnel link on the capped network between a central switch of a sector and a central switch of another sector.

6. The communication infrastructure according to claim 1, wherein the first and second central switches of the communication network are integrated into an integrated electric switch.

7. The communication infrastructure according to claim 1, wherein the first local switches and the second local switches of the communication network are placed in alternation within said communication network.

8. The communication infrastructure according to claim 1, including an administration interface.

9. The communication infrastructure according to claim 1, applying a priority/segregation service over said or each communication network, for communicating data of a signaling application and data of other types of applications.

10. The communication infrastructure according to claim 1, wherein the communication network is of an IP-MPLS type.

* * * * *